3,652,469
POLYMERIC FAT ACID POLYAMIDE RESIN INK BINDER

David W. Glaser and Paul D. Whyzmuzis, St. Paul, Minn., assignors to General Mills, Inc.
No Drawing. Filed Dec. 2, 1969, Ser. No. 881,571
Int. Cl. C09d *11/06;* C08g *20/26*
U.S. Cl. 260—18 N                                    13 Claims

ABSTRACT OF THE DISCLOSURE

Polymeric fat acid polyamide resins obtained by reacting an acid mixture comprising a polymeric fat acid and a low aliphatic monocarboxylic acid with an amine mixture comprising an alkylene diamine and a polyhexamethylene polyamine, such as bis(hexamethylene) triamine. The resins are particularly useful in flexographic ink where the resins perform as a binder for the ink, the resins generally being used in the form of alcohol solutions thereof.

---

This invention relates to polymeric fat acid polyamides and in particular to polyamides obtained by reacting an acid mixture comprising a polymeric fat acid and a low aliphatic monocarboxylic acid with an amine mixture comprising an alkylene diamine and a polyhexamethylene polyamine, such as bis(hexamethylene) triamine. The resins are particularly useful in flexographic ink where the resins perform as a binder for the ink, the resins generally being used in the form of alcohol solutions thereof.

Resins suitable for use as ink binders in flexographic inks should possess a desirable combination of properties such as (1) low viscosity
(2) solubility in alcohols such as propanol or ethanol
(3) good solution stability
(4) good reducibility
(5) good compatibility with modifier such as nitrocellulose and pigments
(6) good extensibility or flexibility
(7) good gloss
(8) good adhesion
(9) low odor
(10) chemical and moisture resistance
(11) resistance to blocking at elevated temperatures
(12) fast solvent release.

The polyamide resins of this invention possess the desired combination of properties noted above and are particularly desirable in that they possess (a) a high degree of solubility in propanol and ethanol, (b) a high degree of reducibility with these solvents, (c) a high degree of resistance to gellation at low temperatures and a fast recovery from the gelled state where it occurs, (d) a high degree of resistance to ice water and (e) a high degree of fast solvent release. In addition, the polyamide resins of this inventon can be prepared at lower cost while retaining or improving the desired properties.

In general, the resins are preferably prepared by reaction in the temperature range of about 100–300° C. accompanied by removal of any by-produtc water. The reaction is preferably carried out at about 250° C. The time of reaction may also be varied widely and will depend somewhat on temperature. Normally a time period of 3 to 8 hours after reaching the selected temperature is required. The preferred time of reaction is about 5 hours. A typical set of reaction conditions is 250° C. for a period of 5 hours. Vacuum may be applied if desired to withdraw volatile by-products and to keep the resin mixture from contact with air which may cause darkening. An inert gas may also be employed to avoid contact with air.

The alkylene diamines that are preferably employed are those of the formula

$$H_2N-R-NH_2$$

where R is an alkylene radical having from 2 to 8 carbon atoms such as ehtylene diamine, diaminopropane, diaminobutane, and hexamethylene diamine. R may be branched or straight chained, the straight chained radicals being more preferred.

The polyhexamethylene polyamines have the general formula

$$H_2N[(CH_2)_6NH]_n(CH_2)_6NH_2$$

where $n$ is a small integer, i.e. 1, 2 or 3. The polyhexamethylene polyamine may consist of a mixture of various homologs in the polyhexamethylene polyamine series or may be a substantially pure compound such as bis(hexamethylene) triamine, which is preferred.

The low aliphatic monocarboxylic acids that are preferably employed are those of the formula R'COOH, where R' is hydrogen or an aliphatic hydrocarbon radical having from 1 to 8 carbon atoms. Acids contemplated within the scope of this invention are formic acid, acetic acid, propionic acid, isobutyric acid, n-butyric acd, hexoic acid, 2-ethyl hexoic acid. R' may accordingly be straight or branched chained, the branched chained radicals being preferred.

Polymeric fat acids are commercially available products. A description of these acids and their method of preparation may be found in U.S. Pat. 3,201,471. As indicated in this patent, polymeric fat acids result from the polymerization of saturated, ethylenically unsaturated or acetylenically unsaturated naturally occurring or synthetic monocarboxylic aliphatic acids containing from 8 to 24 carbon atoms. Commercially the 18 carbon atom monocarboxylic acids such as oleic, linoleic, linolenic, and eleostearic acids are employed as starting materials for the preparation of the polymeric fat acids. Tall oil fatty acids, which are predominantly a mixture of oleic and linoleic acids, is the most common starting material.

After polymerization with or without a catalyst, the resulting product, is a mixture of predominantly dimeric fat acids, some trimeric and higher polymeric fat acids and some unpolymerized monomeric fat acids. Commercially available polymeric fat acids will have a dimeric fat acid content of about 60–80% by weight, a trimeric and higher polymeric fat acid content of about 10 to 35%, and a monomeric fat acid content of about 5 to 20% by weight. For the purposes of this invention, it is preferable that the dimeric fat acid content not exceed 85% by weight, the monomeric fat acid content not exceed 20% by weight and the trimeric fat acid content not exceed 35% by weight.

Reference has been made above to the monomeric, dimeric and trimeric fat acids present in the polymeric fat acids. The amounts of monomeric fat acids, often referred to as monomer (M), dimeric fat acids, often referred to as dimer (D), and trimeric or higher polymeric forms, often referred to as trimer (T), may be determined by gas liquid chromatography (GLC) of the methyl esters of the polymeric fat acids. In this method of analysis, an intermediate (I) is seen between the monomer and dimer forms. It is desirable that this intermediate be low but polymeric fat acids generally having less than 10%, and preferably less than 6% intermediate by weight are satisfactory. Unless otherwise indicated, this analytical method was employed in the analysis of the polymeric fat acids employed in this invention.

The polymeric fat acids may be fractionated to provide products having higher dimer contents, by conventional distillation, or solvent extraction techniques may be employed therefor. They may also be hydrogenated (before or after distillation) to reduce unsaturation, under hydrogen pressure in the presence of a hydrogenation catalyst. It is also understood that such other derivatives of polymeric fat acids which are capable of forming amides in reaction with a diamine, such as the lower alcohol (1–8 carbon atoms) esters of polymeric fat acids may be employed in place of the acids themselves in which the by-product is then a lower alcohol rather than water.

Preferably, the polyamides of this invention are prepared with the equivalents of amine groups employed being substantially equivalent to the equivalents of carboxylic groups employed. However, slight excesses, of the order of up to about 10% of either acid groups or amine groups are contemplated within "substantially equivalent." In addition, other co-acids (dicarboxylic) may optionally be employed such as a phthalic acid. While isophthalic acid is preferred, phthalic and terephthalic acids or their equivalent, including hexahydrophthalic, may be employed.

The amounts of reactants employed may be expressed as follows:

| Reactant | Equivalent percent | | |
|---|---|---|---|
| | General range | Preferred range | Preferred specific |
| Total carboxyl: | | | |
| (a) Polymeric fat acids | 50–75 | 55–60 | 58 |
| (b) Monocarboxylic acid | 25–40 | 30–40 | 36 |
| (c) Co-dicarboxylic acid | 0–10 | 4–8 | 6 |
| Total amine: | | | |
| (a) Alkylene diamine | 50–90 | 55–70 | 57 |
| (b) Polyhexamethylene triamine | 10–50 | 30–45 | 40 |

The invention can best be illustrated by means of the following examples in which the resins were prepared by the following procedure.

RESIN PREPARATION

The reactants are charged into a three neck, round bottom flask fitted with thermometer, mechanical stirrer, distilling column and receiving flask. The mixture is stirred and heated to 140° C. and held there for 0.5 hour at which point the by-product water begins to distill off. The temperature is then increased to 250° C. and held there for three hours under slight nitrogen pressure to exclude air from the flask. Full water pump vacuum (i.e. about 20 mm. mercury) is then applied for one hour at 200° C. The flask is cooled to 170° C., vacuum broken, and the contents are discharged.

A 40% solids varnish is prepared by dissolving the above product in denatured ethanol. A white flexographic ink is prepared by dispersing 40 grams titanium oxide into 60 grams of the varnish and 8 grams additional ethanol.

Several resins were prepared by the above described method of preparation in which the reactants and amounts can be seen from the following Table I.

TABLE I

| Composition, equivalent percent | Example number | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Polymeric fat acid:[1] | | | | | | | | | | | | | | | | | | | | |
| A | | 58 | 70 | 46 | 53 | 49 | 40 | 46 | 70 | 58 | 56 | 70 | 58 | 70 | 58 | 48 | 66 | 70 | 58 | 70 |
| B | 58 | | | | | | | | | | | | | | | | | | | |
| C | | | | 20 | 20 | 20 | 18 | 20 | | | 10 | | | | 10 | | | | | 3 |
| Monomeric fat acid (monomer residue from polymerized tall oil fatty acids) | | | | 7 | 7 | 6 | | 7 | | | 7 | | | | | 7 | | | | |
| Isophthalic acid | 6 | 6 | 7 | 7 | | 7 | 6 | 7 | 7 | 6 | 7 | 7 | 6 | 7 | 6 | 6 | | 7 | 6 | |
| Isobutyric acid | 36 | 36 | 12.5 | | | | | 36 | 20 | 12.5 | 36 | 20 | 12.5 | 36 | 12.5 | 36 | 36 | | 12.5 | [2]36 |
| 2-ethyl hexoic acid | | | | | | | | | | 10.5 | | | 10.5 | | 10.5 | | | 10.5 | | |
| Propionic acid | | | | 20 | 20 | 18 | | | | | | | | | | | 27 | | | 27 |
| Ethylene diamine | 67 | 67 | 90 | 80 | 80 | 90 | 67 | 80 | 86 | 60 | 80 | 83 | 67 | 83 | 57 | 60 | 75 | 80 | 67 | 75 |
| Bis(hexamethylene) triamine | 31.5 | 31.5 | 10 | 20 | 20 | 10 | 31.5 | 20 | 14 | 38 | 20 | 17 | 31.5 | 17 | 41 | 38 | 25 | 20 | 31.5 | 25 |

[1] Polymerized tall oil fatty acids:

| Typical analysis (GLC): | Percent | | | | Saponification value |
|---|---|---|---|---|---|
| | M | I | D | T | |
| A | 8.1 | 5.5 | 71.0 | 15.5 | 197 |
| B | 2.5 | 3.8 | 75.2 | 18.5 | 202 |
| C | 2.2 | 0.4 | 34.7 | 62.7 | 197 |

[2] n-Butyric acid.

The properties of the resins prepared above were determined. Since typical ink binders are employed as solutions of from 25–50% resin (non-volatile) based on the total weight of solution and since many flexographic inks employ lower aliphatic hydrocarbon alcohols, the characteristic properties of the resins in alcohol solutions were determined. The alcohol solvents commonly employed are those having the formula R"OH where R" is an aliphatic hydrocarbon radical of 2–5 carbon atoms, such as ethanol, n-propanol, isopropanol and butanol. For the evaluation of the characteristics of the present resins in solution, solutions of the most common solvents, ethanol and n-propanol, were observed. Some of the properties and charatceristics can be seen from the following Table II. In Table II, (a) the softening point or melting point were measured by conventional "Ball and Ring" melting point determinations ASTM E2858T, (b) Amine No. is the milligrams of KOH equivalent to amine alkalinity in one gram sample of resin, (c) Acid No. is the milligrams of KOH equivalent to acidity in one gram sample of resin, (d) Gardner Color and Viscosity are as determined by Federal Test Method Standard No. 141 Method 4248 and 4271, (e) Tack-Free Dry Time is determined by Federal Test Method Standard No. 141, Method 4061, (f) Gel Recovery is determined by storage of a solution sample of the resin at 40° F. until a gel forms and subsequently re-storing the sample at room temperature (72–76° F.) and noting the time at which the sample recovers or is reduced from the gelled state. A recording of 0 indicates no gel formed at 40° F. after 18 hours storage. A recording of "no recovey" indicates no recovery occurred at 24 hours (unless a different time is specified), (g) Reducibility is determined by repeated diluting of the solution sample with small increments of solvent and observing the non-volatile (resin) content to which the resin solution can be diluted before separation of phases occurs, (h) Ice Crinkle Rating is determined by noting the resistance of a flexographic ink coating on treated polyethylene to crinkling after immersion in water at 0° C. for 18 hours. After immersion the coated sheet is grasped with the thumb and index fingers of both hands about ½ inch apart and the fingers rotated in a bicycle pedal manner for 10 cycles and, if no ink is removed, continued for 60 seconds or other indicated time period. The ratings are applied as follows:

| Rating: | Percent coating removed |
|---|---|
| 10 | None |
| 8 | 20 |
| 6 | 40 |
| 4 | 60 |
| 2–0 | 80–100 |

The ink formulation used in the test is as follows:

| Component: | Percent by weight |
|---|---|
| Resin | 24 |
| Titanium oxide pigment | 40 |
| Solvent | 36 | with additional solvent added to give a viscosity of 27 seconds in the Zahn 2 cup.

A typical ink formulation consists essentially of the resin as a binder, a solvent therefor and a pigment. Other optional ingredients are modifiers to provide optional characteristics. An ink formulation with the present resins will preferably be as follows:

| Component: | Amount, percent by weight |
|---|---|
| Resin | 20–30 |
| Solvent | 30–50 |
| Pigment | 30–40 |

Modifiers where employed will preferably be employed in an amount of about 3–7% by weight based on the total composition.

The solvents preferably are alcohols such as ethanol, isopropanol or n-propanol. Water may also be present in relatively small amounts, up to about 10% by weight.

TABLE II

| Example Number | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Resin: | | | | | | | | | | | | | | | | | | | | |
| Softening point, °C | 119 | 119 | 112 | 128 | 127 | 129 | 123 | 122 | 103 | 115 | 118 | 104 | 117 | 101 | 115 | 123 | 132 | 99 | 131 | 132 |
| Amine number | 6.0 | 5.7 | 4.2 | 4.2 | 3.9 | 4.7 | 2.0 | 6.0 | 5.5 | 7.5 | 4.8 | 5.0 | 7.8 | 4.8 | 6.2 | 7.0 | 3.0 | 5.0 | 2.5 | 3.3 |
| Acid number | 1.0 | 1.3 | 3.0 | 2.0 | 2.2 | 2.5 | 1.8 | 2.0 | 2.0 | 2.0 | 2.2 | 2.8 | 2.8 | 2.5 | 1.8 | 4.0 | 2.2 | 2.0 | 4.8 | 2.2 |
| Raw material cost/lb. of product (cents) | 23.8 | 22.3 | 22.1 | 16.5 | 16.4 | 16.5 | 20.8 | 17.5 | 20.7 | 22.4 | 18.5 | 20.7 | 22.3 | 20.7 | 22.7 | 21.6 | 18.0 | 21.0 | 22.2 | 19.1 |
| 40% solution in n-propanol: | | | | | | | | | | | | | | | | | | | | |
| Gardner color | 6+ | 5+ | 8 | 8 | 8 | 8+ | 8 | 6 | 6 | 7 | 8+ | 6+ | 6 | 7+ | 7 | 6 | 6– | 6 | 6+ | |
| Gardner-Holdt viscosity | G | | G | I | J | G | H | K | F– | F– | G | | F | F | H | B+ | H | B+ | G | |
| Gel recovery, minutes | 0 | | 24 | 37 | 51 | 65+ | 0 | 26 | 13 | 0 | 25 | | 0 | 0 | 0 | 67 | 0 | 100+ | 90+ | |
| Tack free time (½ mil), sec | | | 40 | 35 | 30 | | | | | | | | 45 | 40 | 50 | ¹40 | 60 | | | |
| Reducibility-ethanol percent nonvolatiles | 11.8 | 13.2 | 14.6 | 12.9 | 6.8 | 13.3 | 10.9 | 5.0 | 12.5 | | 11.4 | 5.5 | 6.4 | 7.0 | 12.4 | <3.6 | 10.0 | | | |
| 40% solution in ethanol (anhydrous): | | | | | | | | | | | | | | | | | | | | |
| Gardner-Holdt viscosity | B+ | A1+ | B | | B | D+ | A | A | B | B– | A1– | | | | | A1 | | | | |
| Gel recovery, min | 24 | 19 | 25 | | 21 | 37 | 20 | 0 | 35 | 21 | 37 | | 0 | | | 19 | | 110+ | | |
| Tack free time (½ mil), sec | | 30 | 35 | | 30 | 30 | 25 | 30 | 35 | 35 | 30 | | | | | 35 | | | | |
| Reducibility, ethanol, percent nonvolatiles | 12.2 | 8.8 | >25 | | 12.1 | 27.7 | 21.5 | 9.2 | 24.7 | 21 | 5.8 | | | | | 24.8 | 4.0 | 20.1 | | |
| Ice crinkle rating (1 coat—60 sec.) | 9 | 8 | | 8 | 7 | | 9 | 9 | 8 | 7 | 8 | 7 | 8 | 8 | 9 | 8 | 7 | 9 | 8 | 7 |

¹ Hazy.

Additional resins were prepared by the same resin preparation method above described and the resins evaluated. The reactants and amounts may be seen from the following Table III and some of the characteristics and properties of the resins can be seen in the following Table IV.

Unsaturated alcohols such as methyl butynol may also be employed. Mixtures of solvents may also be employed such as a mixture of isopropanol and isopropyl acetate. The alcohol solvents may also be blended with aliphatic hydrocarbons such as hexane or low boiling naphthas.

The pigments are conventional ink pigments, the par-

TABLE III

| Composition, equivalent percent | Example Number | | | | | | | | | | | | | |
|---|---|---|---|---|---|---|---|---|---|---|---|---|---|---|
| | 21 | 22 | 23 | 24 | 25 | 26 | 27 | 28 | 29 | 30 | 31 | 32 | 33 | 34 |
| Polymeric fat acid:¹ | | | | | | | | | | | | | | |
| A | | 54 | 58 | 58 | 58 | 58 | 58 | 62 | 60 | 62 | 58 | 58 | 61 | 59 |
| B | 58 | | | | | | | | | | | | | |
| Isophthalic acid | 6 | 10 | 6 | 6 | 6 | 10 | 6 | 6 | 6 | 6 | 8 | 10 | 6 | 7 |
| Isobutyric acid | 36 | 36 | 36 | 36 | 36 | 32 | 27 | 32 | 34 | 32 | 34 | 34 | 33 | 34 |
| Propionic acid | | | | | | | 9 | | | | | | | |
| Ethylene diamine | 57 | 57 | 57 | 57 | 57 | 57 | 57 | 67 | 61 | 64 | 61 | 61 | ²57 | 61 |
| Bis(hexamethylene) triamine | 39.5 | 39.5 | 39.5 | 39.5 | 39.5 | 39.5 | 39.5 | 31.5 | 36 | 34 | 36 | 36 | 30 | 36 |

¹ Polymerized tall oil fatty acids:

| Typical analysis (GLC) | Percent | | | | Saponification value |
|---|---|---|---|---|---|
| | M | I | D | T | |
| A | 8.1 | 5.5 | 71.0 | 15.5 | 197 |
| B | 2.5 | 3.8 | 75.2 | 18.5 | 202 |

² Plus 10 equivalent percent hexamethylene diamine.

ticular pigment employed being dependent on the particular opacity, tinting strength, and color desired. Illustrative of some suitable pigments are rutile titanium dioxide, carbon black, iron oxide, chrome yellow, phthalocyanine blue, phthalocyanine green, chrome orange, molybdate orange, and toluidine red.

TABLE IV

| | Example Number | | | | | | | | | | | | | |
|---|---|---|---|---|---|---|---|---|---|---|---|---|---|---|
| | 21 | 22 | 23 | 24 | 25 | 26 | 27 | 28 | 29 | 30 | 31 | 32 | 33 | 34 |
| Resin: | | | | | | | | | | | | | | |
| Softening point, °C | 116 | 108 | 114 | 117 | 114 | 110 | 117 | 119 | 120 | 123 | 120 | 120 | 100 | 116 |
| Amine number | 4.5 | 3.8 | 7.7 | 5.5 | 3.2 | 5.2 | 4.8 | 6.2 | 5.2 | 7.2 | 5.0 | 5.0 | 3.7 | 4.8 |
| Acid number | 2.0 | 3.0 | 2.0 | 2.2 | 3.5 | 3.0 | 2.8 | 2.7 | 2.7 | 2.0 | 3.0 | 3.2 | 2.5 | 2.0 |
| 40% solution in ethanol (anhydrous): | | | | | | | | | | | | | | |
| Gardner-Holdt viscosity | D+ | A | B | A+ | A– | B+ | A | A– | A– | A+ | A | A+ | A | A |
| Gel recovery, minutes | 0 | 0 | 0 | 0 | 0 | 0 | 0 | 22 | 2 | 17 | 1 | 0 | 0 | 0 |
| Reducibility, ethanol-percent nonvolatiles | 13.8 | 8.0 | 10.6 | 10.0 | 9.0 | 14.5 | 9.9 | 11.8 | 12.6 | 13.9 | 10.9 | 10.4 | 11.9 | 11.89 |
| Ice crinkle rating (1 coat-60 sec.) | 9 | 9 | 9 | 9 | | 9 | 7 | 9 | 8 | 9 | 8 | 9 | 9 | 9 |

Illustrative of some suitable modifiers are certain rosin derivatives such as ester gums and modified ester gums, maleic resins, phenolic resins, waxes and nitrocellulose.

The embodiments of the invention in which an exclusive property or privilege is claimed are defined as follows:

1. A composition consisting essentially of the reaction product of (A) a polymeric fat acid of a monocarboxylic aliphatic acid containing 8 to 24 carbon atoms, (B) a monocarboxylic acid of the formula R'COOH wherein R' is hydrogen or an aliphatic hydrocarbon radical having from 1 to 8 carbon atoms, (C) a diamine of the formula $H_2NRNH_2$ wherein R is an alkylene radical having from 2 to 8 carbon atoms and (D) a polyhexamethylene polyamine of the formula $H_2N[(CH_2)_6NH]_n(CH_2)_6NH_2$ where $n$ is an integer of from 1-3, the equivalents of amine groups being substantially equal to the equivalents of carboxyl groups, where 50-75 equivalent percent of the carboxyl groups are contributed by said polymeric fat acids and 50-90 equivalent percent of the amine groups are contributed by said alkylene diamine.

2. A composition consisting essentially of the reaction product at temperatures of about 100-300° C. of (A) a carboxyl component comprising (a) 50-75 equivalent percent of a polymeric fat acid of a monocarboxylic aliphatic acid containing 8 to 24 carbon atoms, (b) 25-40 equivalent percent of a monocarboxylic acid of the formula R'COOH where R' is selected from the group consisting of hydrogen and an aliphatic hydrocarbon radical having from 1-8 carbon atoms and (c) 0-10 equivalent percent of a phthalic acid and (B) an amine component comprising (a) 50-90 equivalent percent of a diamine of the formula $H_2NRNH_2$ where R is an alkylene radical having from 2-8 carbon atoms and (b) a polyhexamethylene polyamine of the formula $$H_2N[(CH_2)_6NH]_n(CH_2)_6NH_2$$

where $n$ is a whole integer from 1-3.

3. A composition as defined in claim 2 wherein said polymeric fat acid is a dimer of a $C_{16}$-$C_{20}$ unsaturated aliphatic monocarboxylic fatty acid.

4. A composition as defined in claim 2 wherein said polymeric fat acid is a dimer of a $C_{18}$ unsaturated aliphatic monocarboxylic fatty acid.

5. A composition as defined in claim 2 wherein said polymeric fat acid is polymerized tall oil fatty acids.

6. A composition as defined in claim 2 wherein said polyhexamethylene polyamine is bis(hexamethylene) triamine.

7. A composition as defined in claim 2 wherein said polymeric fat acid is polymerized tall oil fatty acids, said phthalic acid is isophthalic acid, said alkylene diamine is ethylene diamine, said polyhexamethylene polyamine is bis(hexamethylene) triamine and said monocarboxylic acid is selected from the group consisting of propionic acid, n-butyric acid, isobutyric acid, 2-ethyl hexoic acid and mixtures thereof.

8. A composition consisting essentially of the reaction product at temperatures of about 100-300° C. of 58 equivalent percent of polymerized tall oil fatty acids, 6 equivalent percent of isophthalic acid, 57 equivalent percent of ethylene diamine, 40 equivalent percent of bis(hexamethylene) triamine and 36 equivalent percent of a monocarboxylic acid selected from the group consisting of propionic caid, n-butyric acid, isobutyric acid, 2-ethyl hexoic acid and mixtures thereof.

9. A composition as defined in claim 2 and further comprising an alcoholic solvent of the formula R"OH where R" is an aliphatic hydrocarbon radical of 2-5 carbon atoms.

10. A composition as defined in claim 9 wherein said alcoholic solvent is ethanol.

11. A composition as defined in claim 9 wherein said alcoholic solvent is a propanol.

12. A composition as define din claim 2 and further comprising an alcoholic solvent of the formula R"OH where R" is an aliphatic hydrocarbon radical of 2-5 carbon atoms and a pigment.

13. A composition as defined in claim 12 wherein said alcoholic solvent is ethanol and said pigment is titanium oxide and based on the total weight of the composition said ethanol comprises 36%, said pigment comprises 40% and said amidification product comprises 24%.

References Cited

UNITED STATES PATENTS

| | | | |
|---|---|---|---|
| 2,886,543 | 5/1959 | Peerman et al. | 260—18 |
| 3,397,161 | 8/1968 | Miller | 260—18 |
| 3,412,115 | 11/1968 | Floyd et al. | 260—404.5 |
| 3,522,270 | 7/1970 | Glaser | 260—18 |

DONALD E. CZAJA, Primary Examiner

E. C. RZUCIDLO, Assistant Examiner

U.S. Cl. X.R.

106—27; 260—33.4 R, 37 N, 404.5

PO-1050
(5/69)

UNITED STATES PATENT OFFICE
CERTIFICATE OF CORRECTION

Patent No. 3,652,469  Dated March 28, 1972

Inventor(s) David W. Glaser and Paul D. Whyzmuzis

It is certified that error appears in the above-identified patent and that said Letters Patent are hereby corrected as shown below:

Col. 1, line 60, delete "inventon" and substitute ---invention---.
line 64, delete "produtc" and substitute ---product---.
Col. 6, Table III, under "Example 32" delete "58" and substitute ---56---.
Table IV, under "Example No. 34" delete "11.89" and substitute ---11.8---.
Table IV. under "Example No. 34, 11.8" insert ---9---.

Col. 8, Claim 8, line 16, delete "caid" and substitute ---acid---.
Claim 12, line 26, delete "define din" and substitute ---defined in---.

Signed and sealed this 27th day of March 1973.

(SEAL)
Attest:

EDWARD M. FLETCHER, JR.
Attesting Officer

ROBERT GOTTSCHALK
Commissioner of Patents